United States Patent Office

3,589,966
Patented June 29, 1971

3,589,966
TEXTILE WEB IDENTIFICATION
Donald W. Gardner, Spartanburg, S.C., assignor to Deering Milliken Research Corporation, Spartanburg, S.C.
No Drawing. Filed May 9, 1969, Ser. No. 823,517
Int. Cl. B32b 31/04, 31/20
U.S. Cl. 156—277   10 Claims

ABSTRACT OF THE DISCLOSURE

A method for permanently marking a textile web which comprises applying indicia with a resist ink to a thermoplastic tape segment having a flow temperature between about 100° and 225° C., positioning the ink marked tape segment on a textile web, applying heat and pressure to the tape segment and the portion of the web in contact therewith to cause flow of the tape segment with respect to the web, cooling the heated portion and releasing the pressure therefrom.

---

This invention relates to a method of identifying textile webs and more particularly relates to a method of permanently identifying textile fabrics.

It is customary to mark textile fabrics with an identification number or other indicia prior to processing to insure proper treatment of the fabric. This is conventionally done by marking the fabric with a dye resist ink. One commonly used ink is sold by Mark-Tex Corporation, Englewood, N.J., under the trade name "Texpen."

While such resist inks provide good initial identification, the processing of the textile fabric particularly in the wool/worsted system sometimes causes the removal of a part or all of the marking identification. As a result, it is necessary for the operators to be alert that the marking is not lost or if lost, is replaced immediately. It is apparent that such procedure results in human error and the production of seconds or waste. Furthermore, the marking identification is considered a flaw by the garment manufacturer and an allowance is generally made for such flaw in figuring the yardage of the fabric sold to the garment manufacturer.

The present invention provides a novel method for achieving permanent identification of textile webs which provides benefits and advantages not attainable with marking methods heretofore employed.

In accordance with the present invention, textile webs are permanently marked by a method which comprises applying indicia with a resist ink to a thermoplastic tape segment having a flow temperature between about 100° and 225° C., positioning said ink marked tape segment on a textile web, applying heat and pressure to the tape segment and the portion of the web in contact therewith to cause flow of said tape segment with respect to said web, cooling the heated portion and releasing the pressure therefrom.

As pointed out above, the tape has a flow temperature between about 100° and 225° C. This temperature should be below the degradation temperature of the textile web being processed. The flow temperature is a Vicat flow temperature determined according to A.S.T.M. D569–59, procedure A. The tapes may be prepared from a variety of materials including plasticized, partially polymerized phenol-formaldehyde resins, polyurethanes, polyvinyl acetates, polyvinyl butyrates, polyvinyl chlorides, nylon 6, nylon 6-6, the acrylic monomers and methacrylic polymers and mixtures thereof. Thermoplastic materials which become thermosetting upon heating can also be used, e.g., the aminoplasts and the phenolplasts. The selected thermoplastic material should provide a relatively tack-free condition at room temperature, at least after the application of a suitable anti-tack agent.

The thermoplastic tape segment is marked with suitable indicia such as a style number or lot number with a resist ink prior to the positioning of the tape segment on the textile web. An example of a suitable resist ink is that employed in the "Texpen" described above although many other suitable inks are available. After the tape has been properly marked with the resist ink, the tape is positioned on the textile web.

The textile web which is identified in accordance with the method of the invention is a web which is to be processed in a system which produces a substantial amount of "web working," agitation and/or felting during the processing. For example, such "working" occurs in the wool/worsted system during fulling and certain dyeing operations. The web advantageously is a woven or knitted fabric and preferably is made from wool fibers, other keratinous fibers or synthetic fibers used in combination with wool or in place thereof. Examples of such synthetic fibers include acrylic, polyester, polyamide fibers and the like.

The ink marked tape segment and the portion of the textile web in contact therewith is subjected to heat and pressure to cause flow of the thermoplastic tape segment. Advantageously, a pressure of at least 10 p.s.i. is employed and preferably between about 25 and 200 p.s.i. and more particularly between about 50 and 100 p.s.i. Excessive pressures which cause crushing of the fabric are to be avoided.

The tape segment and textile web combination is heated under pressure as described above to at least the flow temperature of the thermoplastic material from which the tape is formed and preferably about 25° C. above the temperature. However, as pointed out above the temperature should be below the degradation temperature of the textile web. While insignificant web degradation may be tolerated, the degradation due to heating should be insufficient to significantly weaken the web or the threads or yarns from which it is formed. It is desirable that the thermoplastic tape be selected to have a flow temperature between about 100° and 200° C. so that the heating will be in a preferred range of about 150° and 225° C.

The tape segment and textile web portion are heated to the selected temperature to cause the material from which the tape is formed to flow into intimate contact with the textile web. This contact is generally achieved in less than about one minute and usually between about 2 and 45 seconds depending upon the temperature employed, the flow characteristics of the thermoplastic tape and the efficiency of the heating system employed.

The heating may be accomplished by a number of different methods including diathermic and conductive heating. Especially useful are systems in which heated platens or plates are disposed on either side of the tape segment and web portion in contact therewith. This permits the simultaneous application of heat and pressure to insure a high degree of efficiency in the heating operation.

The textile web with the tape permanently attached thereto is permitted to cool below the soften temperature of the thermoplastic material from which the tape is formed. This causes the tape to adhere tightly to the face of the textile web or fabric. The pressure is released face of the textile web or fabric. The pressure is released from the fabric either prior to the cooling step, simultaneously therewith or subsequent thereto as desired.

The invention will be described in greater detail with reference to the following examples which are intended to illustrate the invention without restricting the scope thereof.

EXAMPLE I

A thermoplastic-thermosetting plasticized phenolic resin tape (3M Corporation Type 583 tape) is marked with a "Texpen" to set forth the piece number. The marked segment of the tape has the release backing film removed therefrom and then is positioned on the selvage of a woolen/worsted greige fabric. The tape and the fabric portion in contact therewith are heated using a pair of platens at a temperature of about 200° C. with a pressure applied to the platens of about 70 p.s.i. The heat and pressure are maintained for about 35 seconds. The platens are separated to permit the tape and fabric to cool.

The resulting fabric is processed in a conventional normal wool/worsted system including a fulling operation without loss of the piece number marking. Control fabrics which are identified by marking piece numbers on the fabric directly with a resist ink, after processing show partial or complete loss of the markings.

EXAMPLE II

The procedure of this example is the same as that of Example I except that a dyeing operation is included and the platen temperature is varied incrementally from about 190° to 225° C. and the heating time varied inversely to the change in temperature from about 10 to 120 seconds.

The markings on the resulting fabrics are in good condition and legible after the processing of the fabrics.

EXAMPLE III

The procedure of this example is the same as that of the preceding examples except that the pressure is varied incrementally for a series of fabrics from about 25 to 200 p.s.i. with the same results.

EXAMPLE IV

The procedure of this example is the same as that of the preceding examples except that the fabric is replaced with wool blend fabrics with acrylic fibers, polyester fibers and polyamide fibers and also replaced with fabrics made with 100% acrylic fibers. The results are similar to those of the preceding examples.

The above description and examples show that the present invention provides a novel method for significantly improving the permanency of indicia on textile webs. The method of the invention is particularly useful with fabrics to be processed in systems which include a significant degree of fabric working such as the wool/worsted system.

It will be apparent that various modifications and changes in the procedures and materials can be made within the scope of the invention. Therefore, the foregoing description and examples are intended to illustrate particular embodiments of the invention, and the scope of the invention is to be limited only by the following claims.

That which is claimed is:

1. A method for permanently marking a textile web which comprises applying indicia with a resist ink to a thermoplastic tape segment having a flow temperature between about 100° and 225° C., positioning the ink marked tape segment on a textile web, applying heat and pressure to the tape segment and the portion of the web in contact therewith, flowing a part of the heated tape segment into said textile web, cooling the heated portion and releasing the pressure therefrom.

2. A method according to claim 1 wherein the textile web is a fabric including wool fibers.

3. A method according to claim 1 wherein the textile web is a fabric including acrylic fibers.

4. A method according to claim 1 wherein the heating is to a temperature between about 150° and 225° C.

5. A method according to claim 1 wherein the applied pressure is between about 10 and 200 p.s.i.

6. A method according to claim 1 wherein the tape is a plasticized, partially polymerized phenolic resin tape.

7. A method according to claim 1 wherein the tape is a nylon 6 tape.

8. A method according to claim 1 wherein the tape is a polyvinyl chloride tape.

9. A method according to claim 1 wherein the tape is a polyurethane tape.

10. A method according to claim 1 wherein the tape is a thermoplastic-thermosetting phenolic resin tape, the textile web is a fabric including wool or acrylic fibers, the heating is to a temperature between about 150° and 225° C. and the applied pressure is between about 25 and 100 p.s.i. for a period of time between about 2 and 45 seconds.

References Cited
UNITED STATES PATENTS

| | | | |
|---|---|---|---|
| 2,302,179 | 11/1942 | Bronfman | 156—277X |
| 2,862,832 | 12/1958 | Shepherd, Jr. | 156—240 |
| 3,486,924 | 12/1969 | Flanner | 117—38 |
| 3,494,776 | 2/1970 | Sinclair et al. | 117—38X |

CARL D. QUARFORTH, Primary Examiner

R. S. GAITHER, Assistant Examiner

U.S. Cl. X.R.

117—3.2; 156—240, 311